March 12, 1935.  W. E. DEAN  1,994,192
FLUID PRESSURE BRAKE
Filed May 20, 1931  4 Sheets-Sheet 1
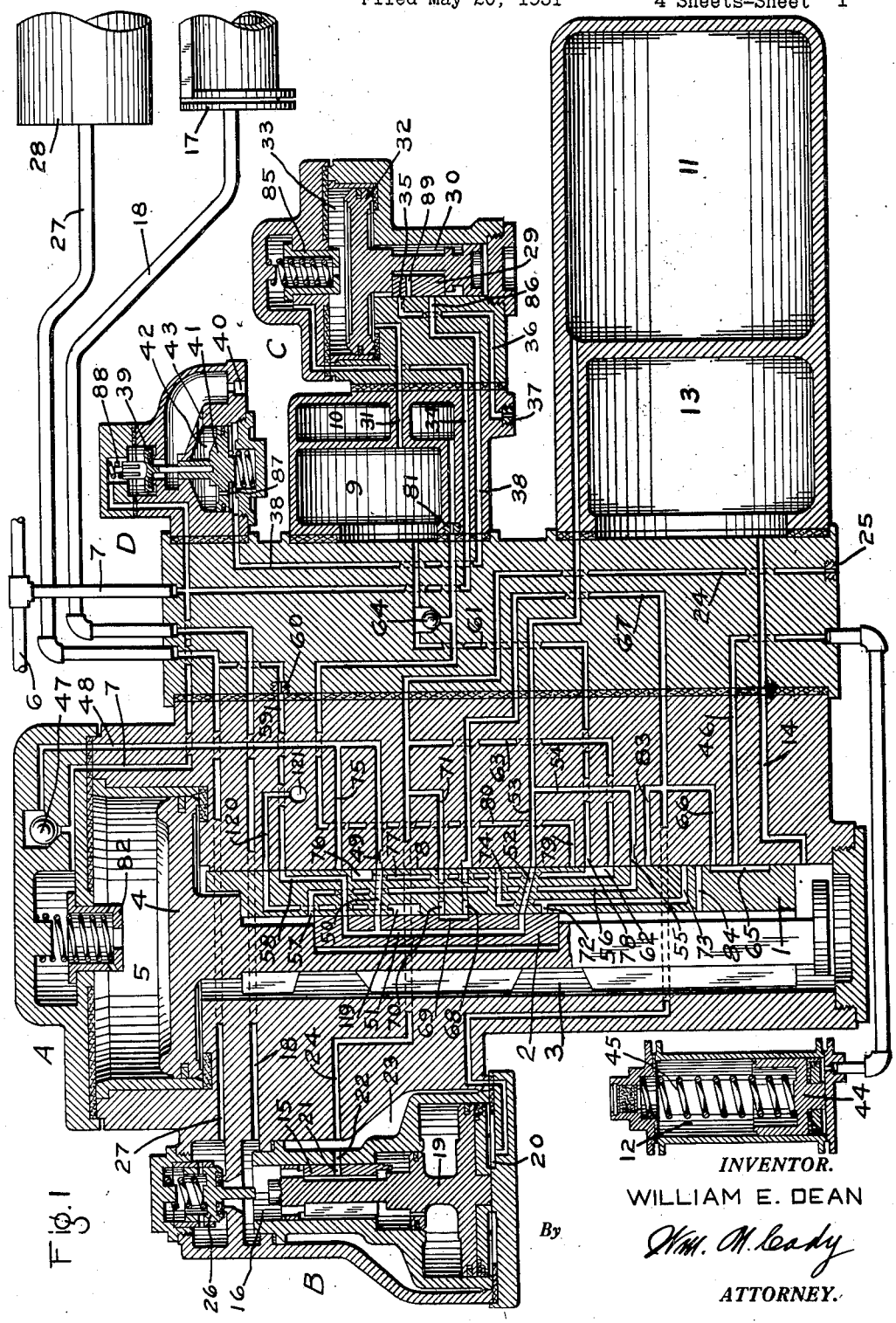
INVENTOR.
WILLIAM E. DEAN
By
ATTORNEY.

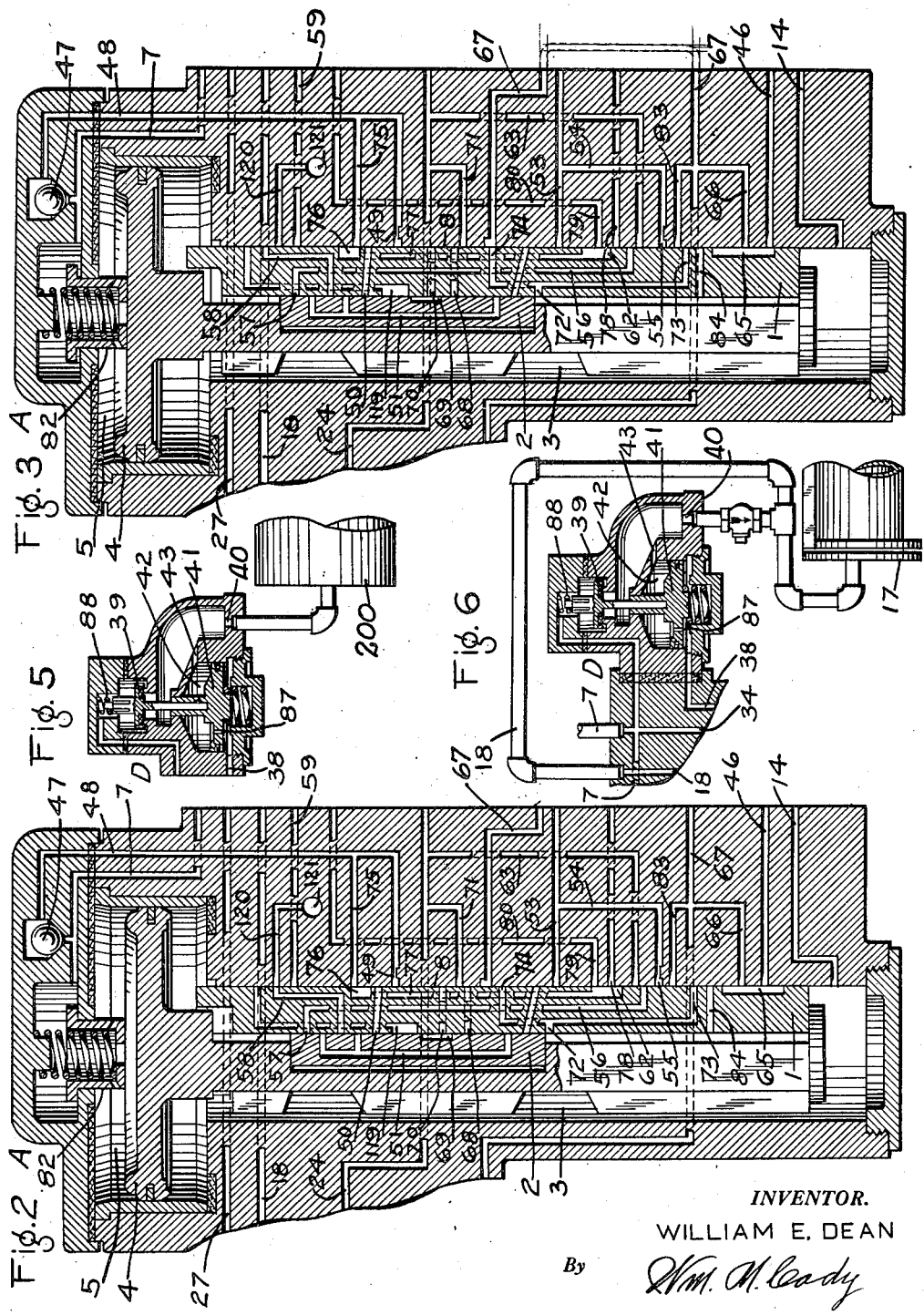

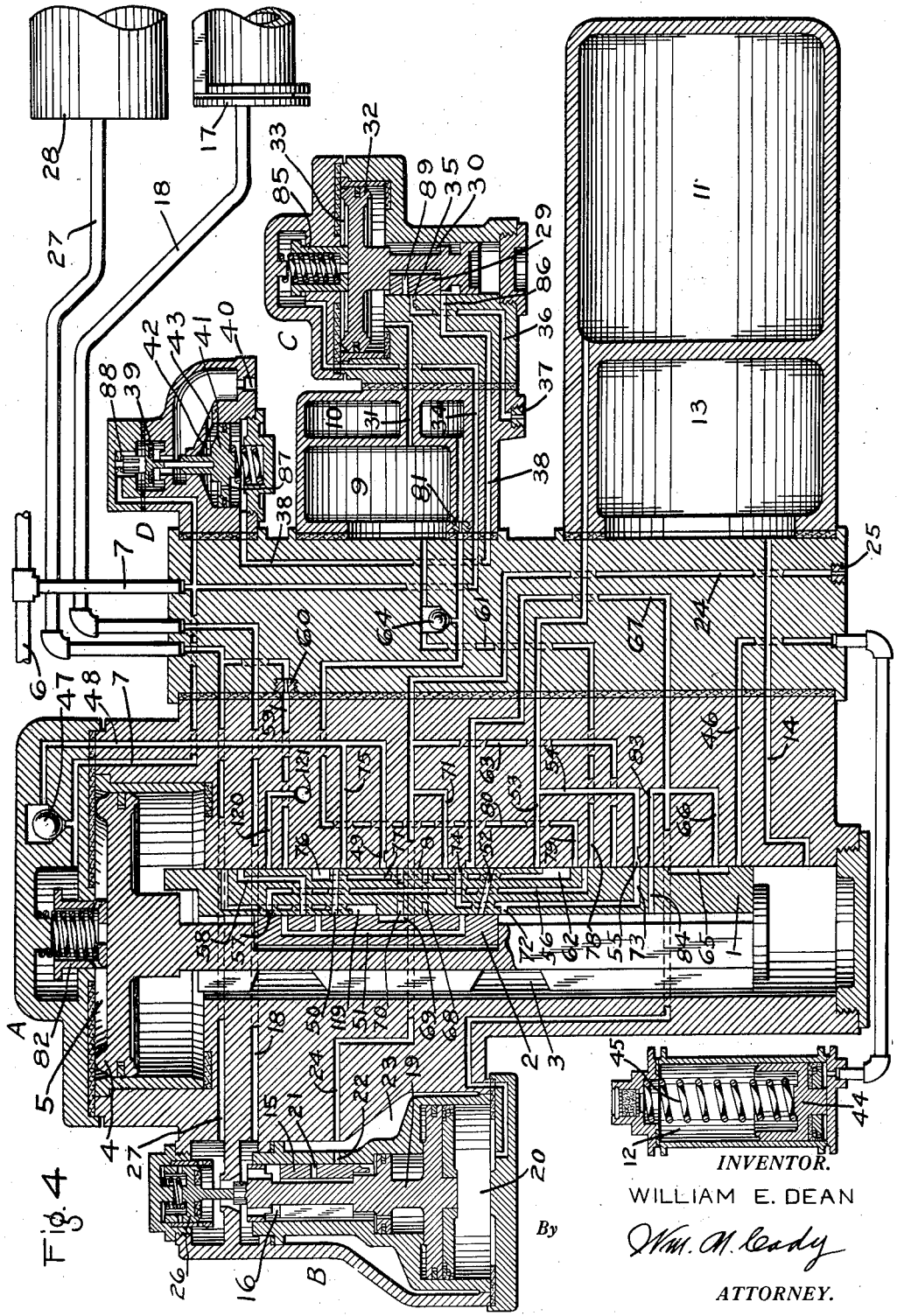

March 12, 1935.  W. E. DEAN  1,994,192

FLUID PRESSURE BRAKE

Filed May 20, 1931  4 Sheets-Sheet 4

Fig. 7

INVENTOR.
WILLIAM E. DEAN
By
*Wm. M. Cady*
ATTORNEY.

UNITED STATES PATENT OFFICE 1,994,192

FLUID PRESSURE BRAKE

William Edward Dean, Strathfield, New South Wales, Australia, assignor to The Westinghouse Air Brake Company, Wilmerding, Pa., a corporation of Pennsylvania Application May 20, 1931, Serial No. 538,690
In Great Britain May 28, 1930

7 Claims. (Cl. 303—35)

This invention relates to fluid pressure braking apparatus of the kind in which the supply of fluid to and its release from the brake cylinder or cylinders of the apparatus is controlled by a triple or other form of distributing valve in accordance with variations in the brake pipe pressure and has for its object to provide improved apparatus of this character.

The invention more particularly relates to apparatus of the above character in which an accelerating bulb or chamber is provided into which fluid under pressure is arranged to be vented from the brake pipe when the pressure in this pipe is reduced to effect an application of the brakes, the action of the bulb or chamber being to cause a local reduction in brake pipe pressure and thereby assist in the propagation of the braking action throughout the train.

It is evidently necessary that the fluid under pressure thus admitted to the accelerating bulb or chamber should be wholly or partly released therefrom prior to the next successive or a further brake application and for this purpose it is usual to arrange for communication to be established between the bulb and the atmosphere or the brake cylinder during the release of the brakes. With this arrangement the energy contained in the fluid under pressure in the bulb or chamber is dissipated when the fluid is released from the bulb and according to the principal feature of the present invention this energy is arranged to be usefully employed by causing the fluid vented from the bulb or chamber to operate a valve device for effecting any desired action or control in connection with the operation of the brakes.

The valve device may for example be arranged when actuated to effect a local venting of the brake pipe to the atmosphere, in an emergency application of the brakes or in the same circumstances to effect the supply of fluid under pressure from the brake pipe to the brake cylinder or other closed receptacle.

According to a further feature of the invention the movement of the triple or other form of distributing valve to its release position, when the brake pipe pressure is restored after an application of the brakes in order to effect their release, is arranged to be accelerated and facilitated by temporarily establishing communication between the auxiliary reservoir and the atmosphere or a suitable receptacle so as to produce a temporary reduction in auxiliary reservoir pressure and thereby enable the brake pipe pressure more readily to move the triple valve to its release position.

For this purpose the initial movement of the main slide valve of the triple valve or preferably the initial movement of the graduating valve is arranged to establish the communication above referred to between the auxiliary reservoir and the atmosphere or suitable receptacle, this communication being cut off before the triple valve attains its full release position whereupon the auxiliary reservoir pressure is restored to its normal value in the usual manner by the supply of fluid under pressure from the brake pipe or otherwise.

Fig. 1 is a diagrammatic sectional view of a fluid pressure brake equipment embodying my invention; Fig. 2 a sectional view of the triple valve portion of the equipment shown in Fig. 1, showing the moving parts in quick service position; Fig. 3 a view similar to Fig. 2, showing the triple valve device in service application position; Fig. 4 a view similar to Fig. 1, but showing the moving parts in emergency application position; Fig. 5 illustrates an emergency vent valve similar to that employed in Fig. 1, but in which fluid is vented from the brake pipe to a reservoir; Fig. 6 an emergency vent valve arrangement, in which fluid is vented from the brake pipe to the brake cylinder; and Fig. 7 a sectional view of a construction in which my invention is shown applied to the ordinary type of triple valve device.

Referring now first to the apparatus shown in Figure 1 it will be seen that the distributing valve comprises a triple or controlling valve device A, a relay valve device B, a quick action valve device C and a vent valve device D.

The controlling valve device A comprises a main slide valve 1 provided with a graduating valve 2 contained in a valve chamber 3 and adapted to be operated by a piston 4 contained in a piston chamber 5 which is in communication with the brake pipe 6 of the apparatus through a pipe and passage 7.

The seat 8 of the slide valve 1 is provided with a number of ports which will hereinafter be particularly specified and which lead to a quick service bulb 9, an auxiliary bulb 10, a supplementary reservoir 11, a dummy brake cylinder 12, and the relay valve B, the auxiliary reservoir 13 being in open communication with the valve chamber 3 through a passage 14.

The relay valve device B comprises a slide valve 15 contained in a valve chamber 16 which is in open communication with the brake cylinder 17 of the apparatus through a pipe and passage 18. The slide valve 15 is adapted to be operated by a piston 19 the lower face of which is subject to the pressure in a cylinder 20, the upper face of the piston 19 being subject to the brake cylinder pressure in the chamber 16.

The slide valve 15 is adapted to control communication through a port 21 in the slide valve and a port 22 in the slide valve seat between the chamber 16 and a chamber 23 which communicates through a passage 24 with a restricted atmospheric outlet 25.

The valve device B also comprises a spring controlled supply valve 26 controlling communication between the valve chamber 16 and a pipe and passage 27 leading to a service reservoir 28.

The quick action valve device C comprises a slide valve 29 contained in a valve chamber 30 which is in open communication with the bulb 9 through a passage 31, the slide valve 29 being adapted to be operated by a piston 32 subject on one side to the pressure in the chamber 30 and on the opposite side to the pressure in a chamber 33 communicating by means of a passage 34 with the brake pipe passage 7.

A restricted port 35 in the seat of the slide valve 29 leads through a passage 36 to a restricted atmospheric outlet 37 and another port in the slide valve seat leads to a passage 38 communicating with the vent valve device D.

The vent valve device D comprises a spring controlled vent valve 39 controlling communication between an outlet 40 and the brake pipe passage 7, the valve 39 being adapted to be operated by a spring controlled piston 41 subject on its lower side to the pressure obtaining in the passage 38 and on its upper side to the pressure in a chamber 42 communicating through a restricted port 43 with the outlet 40.

The dummy brake cylinder 12 is provided with a piston 44 subject on its outer side to the action of a spring 45, the cylinder 12 on the opposite side of the piston 44 communicating through a passage 46 with a port in the seat 8 of the slide valve 1.

In order to maintain the graduating valve 2 closely in engagement with the main slide valve 1 a cavity 119 is provided leading through a passage 120 to an atmospheric port 121 in the release position of the slide valve.

The operation of the apparatus is as follows:—

In Figure 1 the apparatus is shown as in its release and charging position in which the fluid under pressure is being supplied from the brake pipe 6 through passage 7, past a non-return ball valve 47 to a passage 48 leading to a restricted port 49 in the slide valve seat 8. Thence through a port 50 in the slide valve 1, fluid is supplied to a passage 51 in the graduating valve 2. A port in the graduating valve 2 communicating with the passage 51 establishes communication through a port 52 in the slide valve 1 with a passage 53 leading to the supplementary reservoir 11, a branch passage 54 from the passage 53 leading to a restricted port 55 in the slide valve seat 8.

The port 55 communicates through a passage 56 in the slide valve 1 with a port 57 which, in the position of the graduating valve shown in Figure 1, is open to the valve chamber 3. The latter and the auxiliary reservoir 13 are thus charged with fluid under pressure. The passage 51 in the graduating valve 2 also communicates through a port 58 with a passage 59 leading through a restricted port 60 to the pipe and passage 27 leading to the service reservoir 28.

It will thus be seen that the auxiliary reservoir 13, the service reservoir 28 and the supplementary reservoir 11 are all charged with fluid at brake pipe pressure.

The brake cylinder 17 is in communication with the atmosphere by way of the pipe and passage 18, valve chamber 16 of the relay valve device B, ports 21 and 22, passage 24 and atmospheric outlet 25. The bulb 9 is in communication with the atmosphere by way of passage 61, a cavity 62 in the slide valve 1 and a passage 63 leading to the passage 24, any fluid under pressure in the auxiliary bulb 10 being vented to the passage 61 past a non-return ball valve 64. The dummy brake cylinder 12 is in communication with the atmosphere by way of the passage 46, a cavity 65, passages 66 and 67, port 68 in slide valve 1, cavity 69 in graduating valve 2, port 70 and passages 71 and 24.

In order to effect a service application of the brakes, the brake pipe pressure is reduced in the usual manner so as to cause the piston 4 to move upwards carrying with it the graduating valve 2. Communication between the brake pipe 6 and the service reservoir 28, the supplementary reservoir 11 and the auxiliary reservoir 13 is cut off at the ports leading to the cavity 51. Communication between the passage 67 leading to the cylinder 20 and dummy brake cylinder 12 and the atmospheric passage 24 is also cut off at the cavity 69 and ports 68, 70. This movement of the graduating valve 2 also closes the port 57 and opens a port 72 leading to ports 73 and 74.

The continued upward movement of the piston 4 causes a corresponding movement of the main slide valve 1 with the result that communication is established as shown in Fig. 2, between the passage 75 leading to the passage 48 and a port 76 communicating by a passage 77 with the cavity 62. In this position of the slide valve 1 the cavity 62 registers with ports 78, 79 leading respectively to the passage 61 and to a passage 80 leading through a restricted port 81 to the auxiliary bulb 10. As a result fluid from the brake pipe 6 flows to the bulb 9 by way of passages 7, 48, and 75, port 76, passage 77, cavity 62, port 78 and passage 61 and from cavity 62 to the bulb 10 through port 79, passage 80 and restricted port 81.

It will be observed that the upward movement of the slide valve 1 above referred to has cut off communication between the passage 63 leading to the outlet 25 and the cavity 62.

The brake pipe 6 is thus locally vented directly into the main bulb 9 and through a restricted port into the auxiliary bulb 10 with the result that the reduction in brake pipe pressure is propagated and accelerated throughout the train in the well known manner.

The continued upward movement of the piston 4 to its service application position as shown in Fig. 3 in which it engages with the usual spring controlled stop 82 in the chamber 5 establishes communication between the port 74 and the passage 67 with the result that fluid under pressure from the auxiliary reservoir 13 and the valve chamber 3 is supplied to the cylinder 20 of the relay valve device B by way of ports 72 and 74 and passage 67. Piston 19 consequently moves upwards cutting off communication between the chamber 16 leading to brake cylinder 17 and the atmospheric passage 24 at the ports 21, 22 in the slide valve 15. During its upward movement the piston 19 opens the supply valve 26 so that fluid under pressure is supplied from the service reservoir 28 to the brake cylinder 17 by way of pipe 27, chamber 16 and pipe and passage 18.

In the service application position of the slide valve 1 the fluid flows from the auxiliary reservoir 13 not only to the cylinder 20 as above described but also to the dummy brake cylinder 12 by way of passage 67, cavity 65 and passage 46 so that the piston 44 is moved outwards against its controlling spring 45.

The reduction in the pressure in the auxiliary reservoir (which is of relatively small capacity) due to flow of fluid to the cylinder 20 and to the dummy brake cylinder 12 causes the piston 4 to move to its service lap position in which the port 72 in the slide valve 1 is covered by the graduating valve 2, the supply of fluid to the cylinders 20 and 12 being thus interrupted.

The supply valve 26 is maintained in its open position as above explained until the brake cylinder pressure in the chamber 16 attains a value sufficient to cause a downward movement of the piston 19 acting in opposition to the pressure of the fluid in the cylinder 20 whereupon the supply valve 26 closes and the further supply of fluid to the brake cylinder 17 from the service reservoir 28 is cut off. Successive further reductions in brake pipe pressure will evidently cause a further supply of fluid to the brake cylinder in a similar manner.

In order to graduate the release of the brakes, the brake pipe pressure is increased with the result that the piston 4 and main slide valve 1 are moved downwards to the release position shown in Figure 1 in which the release of fluid from the cylinder 20 and from the dummy brake cylinder 12 is effected by way of the passage 67, port 68, cavity 69, port 70 and passages 71 and 24. The consequent reduction in the fluid pressure in the cylinder 20 permits the piston 19 to move downwards to the position shown under the action of the brake cylinder pressure in the chamber 16 so that fluid is released from the chamber 16, and the brake cylinder 17 through the ports 21, 22 and the passage 24.

The pressure in the auxiliary valve chamber 3 is restored to the increased brake pipe pressure by flow of fluid from the supplementary reservoir 11 through passages 53, 54, 56 and port 57 and as soon as the pressure in the valve chamber 3 slightly exceeds the brake pipe pressure in the piston chamber 5 the piston 4 again moves upwards to close the port 57 and to interrupt the further supply of fluid to the chamber 3. The release of fluid from the cylinder 20 by way of the cavity 69 is also interrupted by the movement of the graduating valve 2 so that when the brake cylinder pressure in the chamber 16 has been correspondingly reduced, the piston 19 and slide valve 15 move upwards to cut off the further release of fluid from the brake cylinder through the ports 21, 22.

In order to fully release the brakes, the brake pipe pressure is increased to the normal standard pressure and the triple piston 4 is thereby moved to release position, where it remains. Fluid under pressure is then released from the brake cylinder through the relay valve device B, as previously described with a graduated release, except that the relay piston 19 then remains in release position, since chamber 20 is maintained at atmospheric pressure, thus permitting fluid to be completely released from the brake cylinder.

Referring now to the action of the quick action valve device C, the piston 32 is normally maintained in the position shown by the brake pipe pressure obtaining in the chamber 33. When the brake pipe pressure is reduced to effect a service or emergency application of the brakes the piston 32 is moved upwards under the pressure of the fluid supplied to the bulb 9 as above described. When during its upward movement the piston 32 abuts against a spring-controlled stop 85, communication is established between the bulb 9 and the atmosphere by way of the passage 31, chamber 30, a port 89, restricted port 35, passage 36 and the restricted outlet 37. The capacity of the outlet 37 is such that the rate of flow of fluid from the bulb 9 to the atmosphere under these conditions is substantially the same as the rate of reduction of brake pipe pressure in a service application.

When a heavy reduction in brake pipe pressure is effected to cause an emergency application of the brakes the piston 4 is moved upwards to its full extent displacing the spring-controlled stop 82 as shown in Fig. 4.

During the upward movement of the piston 4 the main bulb 9 is charged with fluid under pressure from the brake pipe 6 as in a service application as above described the fluid in the bulb 9 being utilized to operate the vent valve device D as will be hereinafter described.

In the final position of the slide valve 1, the valve chamber 3 is in communication with the passage 67 leading to the cylinder 20 by way of a passage 83 and a port 84 in the slide valve 1 and since the port 84 is not controlled by the graduating valve 2, it will be evident that the pressures in the auxiliary reservoir 13 and the cylinder 20 will equalize so that the piston 19 will move upwards and maintain the supply valve 26 open so as to supply full service reservoir pressure to the brake cylinder 17.

Referring now to the action of the quick action valve device C and the vent valve device D in an emergency application of the brakes the rapid reduction in brake pipe pressure causes the pressure in the chamber 33 to be reduced more rapidly than the rate of reduction of pressure in the bulb 9 by way of the restricted outlet 37 with the result that the piston 32 moves upwards beyond its service application position compressing the spring-controlled stop 85, to a position in which a port 86 leading to the passage 38 is uncovered by the slide valve 29. Fluid from the bulb 9 is thereupon supplied through passage 31, valve chamber 30, port 86 and passage 38 to the underside of the piston 41 of the vent valve device D with the result that the piston 41 moves upwards opening the vent valve 39 and permitting the release of fluid from the brake pipe 6 by way of passage 7 and exhaust outlet 40.

The fluid under pressure beneath the piston 41 is gradually released to the outlet 40 through a port 87 in the piston 41 and the port 43 leading from the chamber 42 so that after an interval of time the vent valve 39 is reclosed under the action of its controlling spring 88.

The reduction in the pressure in the bulb 9 due to the flow of fluid therefrom as above described causes the piston 32 of the quick action device C to return, under the action of the spring controlled stop 85, to its service application position in which the port 89 in the slide valve 29 registers with the restricted port 35 with the result that the bulb 9 is vented to the atmosphere by way of passage 31, chamber 30, ports 89 and 35, passage 36 and atmospheric outlet 37.

As soon as the bulb 9 has been completely vented, the brake pipe pressure in the chamber 33 causes the piston 32 to return to the position shown in Figure 1.

When the brake pipe pressure is restored to effect a release of the brakes after an emergency application as above described the piston 4 first moves the graduating valve 2 to open the port 57, the subsequent initial movement of the slide valve 1 establishing communication between the passage 56 and the port 78. Fluid under pressure from the valve chamber 3 and the auxiliary reservoir 13 is thus vented to the empty bulb 9 by way of the port 57, passage 56, port 78 and passage 61.

A definite limited reduction in auxiliary reservoir pressure is thus effected so that a greater differential pressure acts on piston 4, which facilitates the return of the piston 4 to its release position as the brake pipe pressure is increased to its normal value.

It will be understood that the outlet 40 of the vent valve device D may be arranged to communicate directly with the atmosphere, as shown in Fig. 1, or with a suitable closed receptacle 200, as shown in Fig. 5, so as to limit the extent of brake pipe pressure reduction. Furthermore the outlet 40 may if desired be arranged to communicate with the brake cylinder 17, as shown in Fig. 6, so as to supply fluid under pressure from the brake pipe to the brake cylinder in an emergency application of the brakes.

From the above description it will be appreciated that in the apparatus illustrated in Figure 1, the quick service bulb 9 is utilized in a double capacity to effect a rapid emergency application of the brakes the bulb 9 being first utilized as a receptacle into which fluid from the brake pipe is vented and the fluid thus supplied to the bulb being subsequently utilized to operate a valve device to effect a further release of fluid under pressure from the brake pipe.

Referring now to Figure 7 the invention is illustrated as applied to a well known type of triple valve embodying a regulating valve for controlling the rate of flow of fluid to the brake cylinder during a braking application in such a manner that this flow is restricted during part of the period of supply of fluid. The triple valve piston 4 is adapted to actuate a graduating valve 2 and a main slide valve 1 the seat 8 of which is provided with the usual service port 90, exhaust port 91, and a brake cylinder port 92 leading to the brake cylinder passage 18 these three ports being indicated in dotted lines in Figure 7.

The seat 8 is also provided with a port 93 leading to a chamber 94 above the regulating valve element 95; a port 96 leading through a passage 97 to the auxiliary bulb 10; a port 98 communicating with a passage 99 leading through a non-return ball valve 100 to the main bulb 9 and a port 101 communicating with the piston chamber 5.

The slide valve 1 is provided with a port 102 communicating with a cavity 103 adapted to register with the port 90, a cavity 104, a cavity 105, provided with a port 106, and a port 107. The graduating valve 2 is provided with ports 108, 109 communicating with one another through a passage 110.

The regulating valve element 95 comprises a valve 111 provided with a controlling spring 112 and having a central restricted port 113 establishing communication between the chamber 94 and the brake cylinder passage 18. The valve 111 is arranged to be operated by a flexible diaphragm 114 provided with a head 118, the diaphragm 114 separating the chamber 115 containing the valve 111 and spring 112 from the chamber 116 in open communication with the bulb 10, the chamber 115 being in open communication with the passage 18.

The operation of the apparatus shown in Figure 7 is as follows:—

Under charging or release conditions the parts of the apparatus occupy the position shown, fluid under pressure from the brake pipe flowing through the passage 7 to the piston chamber 5 and by way of ports 101 and 107 to the valve chamber 3 to charge the auxiliary reservoir communicating therewith.

The brake cylinder passage 18 is in communication with the atmosphere by way of port 92, a cavity (not shown) in the slide valve 1 and the exhaust port 91. The bulb 10 is in communication with the atmosphere by way of passage 97, port 96, cavity 104, port 93, past the valve 111 (which is normally maintained open under the action of the spring 112) chamber 115 and the passage 18. The main bulb 9 communicates with the atmosphere through the restricted port 81 interposed between the bulbs 9 and 10.

In order to effect an application of the brakes the brake pipe pressure is reduced in the usual manner and the consequent initial movement of the piston 4 causes the ports 108, 109 in the graduating valve 2 to register with the ports 106 and 107 respectively in the main slide valve 1. Fluid thereupon flows from the piston chamber 5 to the bulb 9 by way of ports 101, 107, 109, passage 110, ports 108 and 106, cavity 105, port 98 and passage 99 thereby effecting a reduction in the pressure in the piston chamber 5 and accelerating the movement of the piston 4 to its application position.

Owing to the relative positions of the ports 101 and 107 it will be seen that the communication above described between the chamber 5 and the bulb 9 is maintained during the initial movement of the main slide valve 1 as the piston 4 moves towards the right.

Upon initial movement of the graduating valve 2, the port 102 is uncovered and upon movement of the main slide valve 1 to service application position, the port 103, which opens to port 102, registers with passage 90, which opens into chamber 94, so that fluid under pressure is supplied from the auxiliary reservoir to the brake cylinder by way of valve chamber 3 to chamber 94 and thence past the open valve 111, chamber 115 and passage 18. The supply of fluid to the brake cylinder as above described constitutes the so called "quick inshot" and effects the rapid application of the brake blocks to the wheels in the well known manner.

During the continued movement of the piston 4 the cavity 105 establishes direct communication between the ports 98 and 101 and fluid under pressure from the chamber 5 is freely supplied to the bulb 9. As the pressure in the bulb 9 is thus being built up, fluid flows from the bulb 9 to the bulb 10 through the restricted port 81 and as soon as the pressure in the bulb 10 attains a predetermined value the valve 111 is closed by the fluid pressure in the chamber 116 acting upon the diaphragm 114 in opposition to the spring 112. After the valve 111 has thus been closed, further communication between the chamber 94 and the chamber 115 can only occur through the restricted port 113 in the valve 111 until the brake cylinder pressure in the chamber 115 has attained a value sufficient to overcome the pressure in the chamber 116 and reopen the valve 111.

It will thus be seen that the regulating valve 111 is normally open and is closed as soon as pressure is built up in the bulb 10, the valve being again reopened as soon as the brake cylinder pressure attains a relatively high value corresponding with the degree of pressure built up in the bulb 10 and chamber 116 by flow from the brake pipe.

In the full service position of the slide valve 1, communication between the bulb 9 and the piston chamber 5 is still maintained through the cavity 105 but return flow of fluid from the bulb 9 to the brake pipe is prevented by the ball valve 100 so that the fluid pressure in the bulb 10 acts continuously upon the diaphragm 114.

The reduction in the pressure in the valve chamber 3 by flow of fluid under pressure therefrom causes the piston 4 to move to its lap position in which the graduating valve 2 covers the port 102 and thus cuts off the further supply of fluid to the brake cylinder.

The release of the brakes is effected in the usual manner by the restoration of the brake pipe pressure towards its normal value with the result that the piston 4 returns to the release position shown in Figure 7 in which fluid from the bulb 10 is vented to the atmosphere by way of the passage 97, port 96, cavity 104, port 93 and the brake cylinder passage 18.

The invention is evidently not limited to any of the particular constructions of valve mechanism above described and illustrated and may be embodied in or applied to any suitable type of triple or distributing valve adapted for fluid pressure braking apparatus for passenger or freight service with or without light and load braking adjustments.

Having now described my invention, what I claim as new and desire to secure by Letters Patent is:—

1. In a fluid pressure brake, the combination with a brake pipe, a brake cylinder, and a triple valve device operated upon a reduction in brake pipe pressure for supplying fluid under pressure to the brake cylinder, of means operated upon a reduction in brake pipe pressure for venting fluid from the brake pipe to a chamber, and a regulating valve device for determining the rate at which fluid is supplied to the brake cylinder, and operated by fluid supplied from the brake pipe to said chamber.

2. In a fluid pressure brake, the combination with a brake pipe and a brake controlling valve device operated upon a reduction in brake pipe pressure for effecting an application of the brakes, of means operative upon a gradual reduction in brake pipe pressure for venting fluid from the brake pipe to a chamber, and valve means subject to the opposing pressures of said chamber and the brake pipe and operative upon a sudden reduction in brake pipe pressure for effecting a venting of fluid from the brake pipe.

3. In a fluid pressure brake, the combination with a brake pipe and a brake cylinder, of a brake controlling valve device operative upon a gradual reduction in brake pipe pressure for supplying fluid under pressure to the brake cylinder and to a chamber and operative upon a sudden reduction in brake pipe pressure for supplying fluid under pressure only to the brake cylinder.

4. In a fluid pressure brake, the combination with a brake pipe and a brake cylinder, of a relay valve device operated by an increase in fluid pressure for supplying fluid under pressure to said brake cylinder, a dummy brake cylinder, and an equalizing valve device operated upon a gradual reduction in brake pipe pressure for supplying fluid under pressure to said brake cylinder and said dummy brake cylinder and operative upon a sudden reduction in brake pipe pressure for supplying fluid under pressure only to said relay valve device.

5. In a fluid pressure brake, the combination with a brake pipe, of a reservoir and a brake controlling valve device subject to the opposing pressures of the brake pipe and said reservoir and operated upon a sudden reduction in brake pipe pressure for venting fluid from the brake pipe to a chamber and upon a subsequent increase in brake pipe pressure for venting fluid from said reservoir to said chamber.

6. In a fluid pressure brake, the combination with a brake pipe, of a reservoir and a brake controlling valve device subject to the opposing pressures of the brake pipe and said reservoir and operated upon a sudden reduction in brake pipe pressure for venting fluid from the brake pipe to a chamber, and valve means operative upon a sudden reduction in brake pipe pressure by fluid vented from the brake pipe to said chamber for effecting a venting of fluid from the brake pipe, said brake controlling valve device being operative upon an increase in brake pipe pressure following a sudden reduction in brake pipe pressure for venting fluid from said reservoir to said chamber.

7. In a fluid pressure brake, the combination with a brake pipe, of a reservoir and a brake controlling valve device subject to the opposing pressures of the brake pipe and said reservoir and operated upon a sudden reduction in brake pipe pressure for venting fluid from the brake pipe to a chamber, and valve means operative upon a sudden reduction in brake pipe pressure by fluid vented from the brake pipe to said chamber for effecting a venting of fluid from the brake pipe, means for slowly venting fluid from said chamber as supplied from the brake pipe, said brake controlling valve device being operative upon an increase in brake pipe pressure following a sudden reduction in brake pipe pressure for venting fluid from said reservoir to said chamber.

WILLIAM EDWARD DEAN.